(12) United States Patent
Saghi et al.

(10) Patent No.: US 8,832,499 B2
(45) Date of Patent: Sep. 9, 2014

(54) METHODS AND STRUCTURE FOR TRAPPING REQUESTS DIRECTED TO HARDWARE REGISTERS OF AN ELECTRONIC CIRCUIT

(75) Inventors: Eugene Saghi, Colorado Springs, CO (US); Richard Solomon, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 167 days.

(21) Appl. No.: 13/567,712

(22) Filed: Aug. 6, 2012

(65) Prior Publication Data

US 2014/0040672 A1    Feb. 6, 2014

(51) Int. Cl.
*G06F 11/00*    (2006.01)
(52) U.S. Cl.
USPC ............................................. 714/30; 714/734
(58) Field of Classification Search
CPC ...................................................... G06F 11/34
USPC .......................... 714/45, 44, 29–33, 733, 734
See application file for complete search history.

(56) References Cited

U.S. PATENT DOCUMENTS

| | | | |
|---|---|---|---|
| 6,571,360 B1 * | 5/2003 | Drogichen et al. | 714/44 |
| 7,500,449 B2 * | 3/2009 | Carter | 119/429 |
| 7,934,033 B2 | 4/2011 | Malwankar et al. | |
| 7,941,587 B2 * | 5/2011 | Brahmadathan et al. | 711/103 |
| 8,364,932 B2 * | 1/2013 | Ali et al. | 711/206 |
| 2011/0029694 A1 | 2/2011 | Blinzer | |
| 2011/0106981 A1 | 5/2011 | Watkins et al. | |
| 2011/0179311 A1 | 7/2011 | Nachimuthu et al. | |

* cited by examiner

*Primary Examiner* — Dieu-Minh Le
(74) *Attorney, Agent, or Firm* — Duft Bornsen & Fettig

(57) ABSTRACT

Methods and structure are provided for trapping incoming requests directed to hardware registers of an electronic device. The electronic device that comprises a set of hardware registers that define a configuration of the electronic device, circuitry that implements programmable logic defining which hardware registers have been flagged for trapping incoming requests, and a shadow memory that includes values corresponding to the flagged hardware registers. The circuitry is further operable to access a value in shadow memory that corresponds to a flagged hardware register, responsive to receiving a request from an external device to access the flagged hardware register.

20 Claims, 6 Drawing Sheets

| REGISTER | TRAP READ? | TRAP WRITE? |
|---|---|---|
| 1 | YES | YES |
| 2 | NO | YES |
| 3 | NO | NO |
| 4 | YES | NO |

| REGISTER | TRAP READ? | INVOKE F/W ON READ? | TRAP WRITE? | INVOKE F/W ON WRITE? |
|---|---|---|---|---|
| 1 | YES | YES | YES | YES |
| 2 | NO | N/A | YES | NO |
| 3 | NO | N/A | NO | N/A |
| 4 | YES | NO | YES | NO |

| FLAGGED REGISTER | VALUE | SHADOW VALUE |
|---|---|---|
| C045 0800 F300 0001 | 1 | 1 |
| C045 0002 0070 FFFF | 15 | 15 |
| C045 00A0 0040 0056 | TRUE | TRUE |
| 6592 F123 0000 6000 | TRUE | FALSE |
| C045 00B0 1642 A13E | TRUE | FALSE |
| C045 0300 0060 5002 | FALSE | TRUE |
| C045 0010 0900 0023 | TRUE | TRUE |
| C045 0070 0004 0003 | 512 | 513 |
| C045 0000 0E00 0192 | 318 | 0 |
| C045 0008 00A0 0557 | FALSE | FALSE |

METHODS AND STRUCTURE FOR TRAPPING REQUESTS DIRECTED TO HARDWARE REGISTERS OF AN ELECTRONIC CIRCUIT

BACKGROUND

1. Field of the Invention

The invention relates generally to electronic devices and more specifically relates to electronic devices that utilize hardware registers.

2. Discussion of Related Art

Electronic devices (e.g., integrated circuits) perform a wide variety of designated functions for electronic systems. For example, electronic devices may be used for data processing, data storage and retrieval, system analysis and control, and many other functions. Electronic devices typically include internal hardware memory components (e.g., hardware registers) to define configuration data indicating how the electronic device should operate. As described herein, configuration data may indicate the current configuration of an electronic device, the current status of an electronic device, etc. An example of configuration data is the configuration space defined according to Peripheral Component Interconnect express (PCIe) standards (e.g., the PCI Express Base Specification, revision 3.0, released on 10 Nov. 2010 by PCI-SIG, herein incorporated by reference).

Using hardware registers to define the configuration of an electronic device is beneficial, because hardware registers can be accessed very quickly when compared with flash memory, RAM, traditional magnetic hard disks, etc. This provides a substantial performance benefit whenever an electronic device alters or consults its own configuration data. Hardware registers also provide a similar performance benefit when an external system attempts to alter or read the configuration of a given electronic device (e.g., via read and/or write operations to change the configuration of the device).

While hardware registers are particularly fast, it may be undesirable to implement configuration data using registers that can be directly manipulated by external devices (e.g., management clients, etc.). Management clients may be designed and manufactured by third parties unfamiliar with the preferred configuration of the electronic device. Therefore, a management client may implement undesirable configuration settings that reduce the performance of the electronic device. For example, a management client may unintentionally alter the configuration of the electronic device to make it non-functional.

Thus it is an ongoing challenge to maintain the performance of hardware registers in electronic devices while enhancing their functionality and flexibility.

SUMMARY

The present invention addresses the above and other problems, thereby advancing the state of the useful arts, by providing methods and structure for "spoofing" configuration data of an electronic device by trapping incoming requests to access specific hardware registers. The requests may then be routed to values in a shadow memory instead of the actual hardware registers that are used to configure the electronic device. This allows the electronic device to be configured by external devices, while at the same time enabling the electronic device to hide one or more portions of its configuration when desired, thereby providing the electronic device an enhanced level of control over its own configuration.

In one aspect hereof, a method is provided for operating an electronic device. The method comprises receiving a request from an external device to access a hardware register that defines a configuration of the electronic device, and determining at the electronic device, based on internal programmable logic, if the hardware register has been flagged for trapping incoming requests. The method also comprises accessing the hardware register responsive to determining that the hardware register is not flagged, and accessing a value in a shadow memory of the electronic circuit responsive to determining that the hardware register is flagged.

Another aspect hereof provides an electronic device. The electronic device comprises a set of hardware registers that define a configuration of the electronic device, circuitry that implements programmable logic defining which hardware registers have been flagged for trapping incoming requests, and a shadow memory that includes values corresponding to the flagged hardware registers. The circuitry is further operable to access a value in shadow memory that corresponds to a flagged hardware register, responsive to receiving a request from an external device to access the flagged hardware register.

BRIEF DESCRIPTION OF THE DRAWINGS

FIG. 4 is a block diagram illustrating an exemplary portion of programmable logic in accordance with features and aspects hereof.

FIG. 5 is a block diagram illustrating an additional exemplary portion of programmable logic in accordance with features and aspects hereof.

DETAILED DESCRIPTION OF THE DRAWINGS

Figure 1:
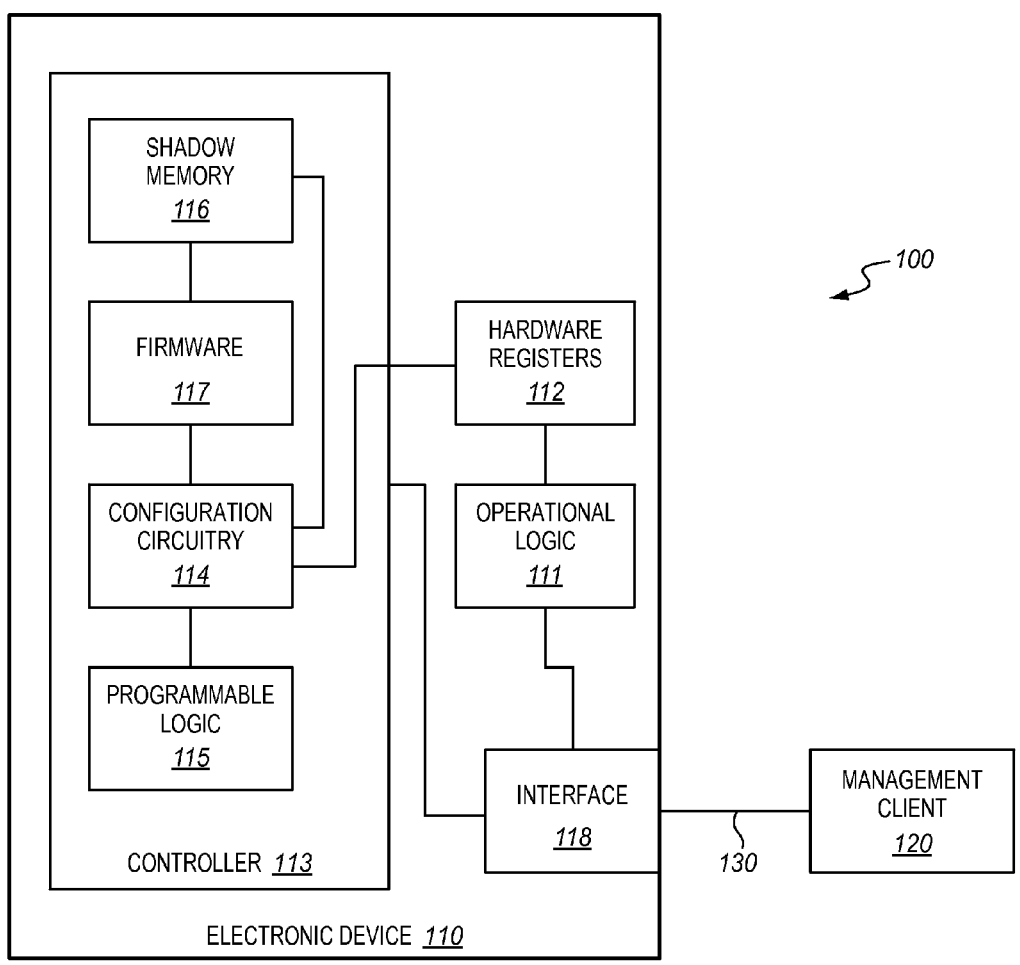
FIG. 1 is a block diagram of an exemplary enhanced electronic device in accordance with features and aspects hereof.

FIG. 1 is a block diagram 100 of an exemplary enhanced electronic device 110 in accordance with features and aspects hereof. In this embodiment, electronic device 110 is coupled with an external device (e.g., management client 120) via communication channel 130. Electronic device 110 has been enhanced so that incoming requests from management client 120 to access internal hardware registers 112 are selectively provided access to either hardware registers 112 or corresponding values stored in shadow memory 116.

Electronic device 110 properly balances issues encountered in prior systems by selectively masking, or "spoofing," the availability of one or more of hardware registers 112. Hardware registers 112 provide the speed desired when altering configuration data, while programmable logic 115 and shadow memory 116 allow for a layer of abstraction to exist between the actual configuration of electronic device 110 and the configuration that is reported to an external device such as management client 120.

In this embodiment, electronic device 110 performs certain designated functions (e.g., the functions for which it was primarily designed, such as routing communications, storing electronic data, analyzing incoming information, processing received data, etc.). The designated functions of device 110 are managed by operational logic 111. Operational logic 111 may be implemented, for example, as custom circuitry, as a special or general purpose processor executing programmed instructions stored in an associated program memory, or some combination thereof. During normal operation, operational logic 111 may access (e.g., read and/or write to) hardware registers 112, which indicate the configuration of electronic device 110. If the values of hardware registers 112 are altered, this may in turn alter the behavior of operational logic 111 as it performs the designated functions of device 110. For example, in a Peripheral Component Interconnect Express (PCIe) circuit, hardware registers 112 may be used to program the PCIe configuration space of device 110. Note that while hardware registers 112 represent the actual configuration of electronic device 110 and are utilized by operational logic 111, values in shadow memory 116 need not correspond to the actual configuration of device 110, and therefore are not typically utilized by operational logic 111.

It may be desirable to enable other devices, such as management client 120, to change the configuration of device 110. This may occur, for example, at start-of-day as an initial configuration process, or may occur while device 110 is operating. In any case, a priori, it may be unknown what type of external device will be coupled with electronic device 110. Because of this, it is often impossible to known whether a management client 120 will be fully compliant with the requirements of device 110 when it attempts to alter the configuration of device 110. If the re-configuration of device 110 by management client 120 is sub-optimal, then device 110 could have its performance hampered (or even entirely disabled).

In order to enable greater control over its configuration, device 110 utilizes controller 113. Controller 113 may be implemented, for example, as custom circuitry, as a special or general purpose processor executing programmed instructions stored in an associated program memory, or some combination thereof. Controller 113 includes shadow memory 116, which includes values that are associated with one or more of hardware registers 112. Controller 113 further includes programmable logic 115, which indicates which hardware registers should have incoming requests trapped and directed to values in shadow memory. Programmable logic 115 may be altered by an administrative device to change, for example, which of hardware registers 112 should be trapped. Additionally or alternatively, programmable logic 115 may be altered by internal components of device 110. Note that in this embodiment, programmable logic 115 and shadow memory 116 may be stored in any form of memory, such as hardware registers, RAM, solid state media, etc.

An external device such as management client 120 may comprise any appropriate system or component or device that is operable to request an alteration to the configuration of device 110. For example, in a PCIe environment, management client 120 may comprise a root complex that attempts to access the configuration of a PCIe device. Depending upon the configuration of the overall electronic system, any combination of external devices (such as management client 120) may be coupled for communication with any number of electronic devices 110.

Communication channel 130 couples management client 120 with electronic device 110. Communication channel 130 may comprise any suitable medium for providing communications between these entities. For example, communication channel 130 may include a wired medium such a physical channel or switched fabric compliant with protocols for PCIe, Serial Attached SCSI (SAS), Fibre Channel, Ethernet, etc. In another embodiment, communication channel 130 may comprise a wireless transmission medium such as the air or a vacuum.

Interface 118 comprises any suitable system, component, or device operable to receive incoming requests encoded according to the format(s) used by management client 120. For example, interface 118 may comprise a wired or wireless interface. In one embodiment, interface 118 comprises a PCIe interface.

While in operation, electronic device 110 receives incoming requests from management client 120 at interface 118, via communication channel 130. Configuration circuitry 114 of controller 113 processes the incoming requests received at interface 118, and consults programmable logic 115 in order to determine whether to trap incoming requests (and re-direct them to values in shadow memory 116) or to allow the incoming requests access to hardware registers 112. Specifically, circuitry 114 of controller 113 checks programmable logic 115 to determine whether a requested hardware register is flagged for trapping. If the register is flagged, circuitry 114 accesses a value in shadow memory 113 instead of the flagged hardware register, and performs the requested read and/or write operation on the shadow memory value.

Using the systems described above, an external device may acquire status information indicating that a requested write operation has been performed on a hardware register of electronic device 110, even though the change actually took place in shadow memory 116 (and therefore may have had no impact on the actual, operating configuration of device 110). Thus, electronic device 110 may protect certain portions of its internal configuration. At the same time, because external devices such as management client 120 receive values in shadow memory (instead of the actual hardware registers), these devices will not engage in error processing because their requests appear to have been processed as desired.

In further embodiments where advanced processing of incoming trapped requests is desirable, circuitry 114 may invoke firmware 117 prior to accessing values in shadow memory 116. Firmware 117 operates on a processor of device 110 to perform additional functions based on received requests. For example, firmware 117 may receive a request to write to a hardware register. Firmware 117 may write the requested data to the shadow memory value, and may perform additional and/or alternative processing to alter the hardware register or other hardware registers based upon internal criteria. The additional functions implemented by firmware 117 may vary based on the present configuration of device 110.

Note that the particular arrangement of components described herein is merely intended to be exemplary, and one of ordinary skill in the art will appreciate that the specific arrangement and configuration of electronic devices (and associated components) is merely a matter of design choice. Further, in some embodiments, in addition to accessing values in shadow memory 116, components of controller 113 may access the values of hardware registers 112 as desired.

Figure 2:
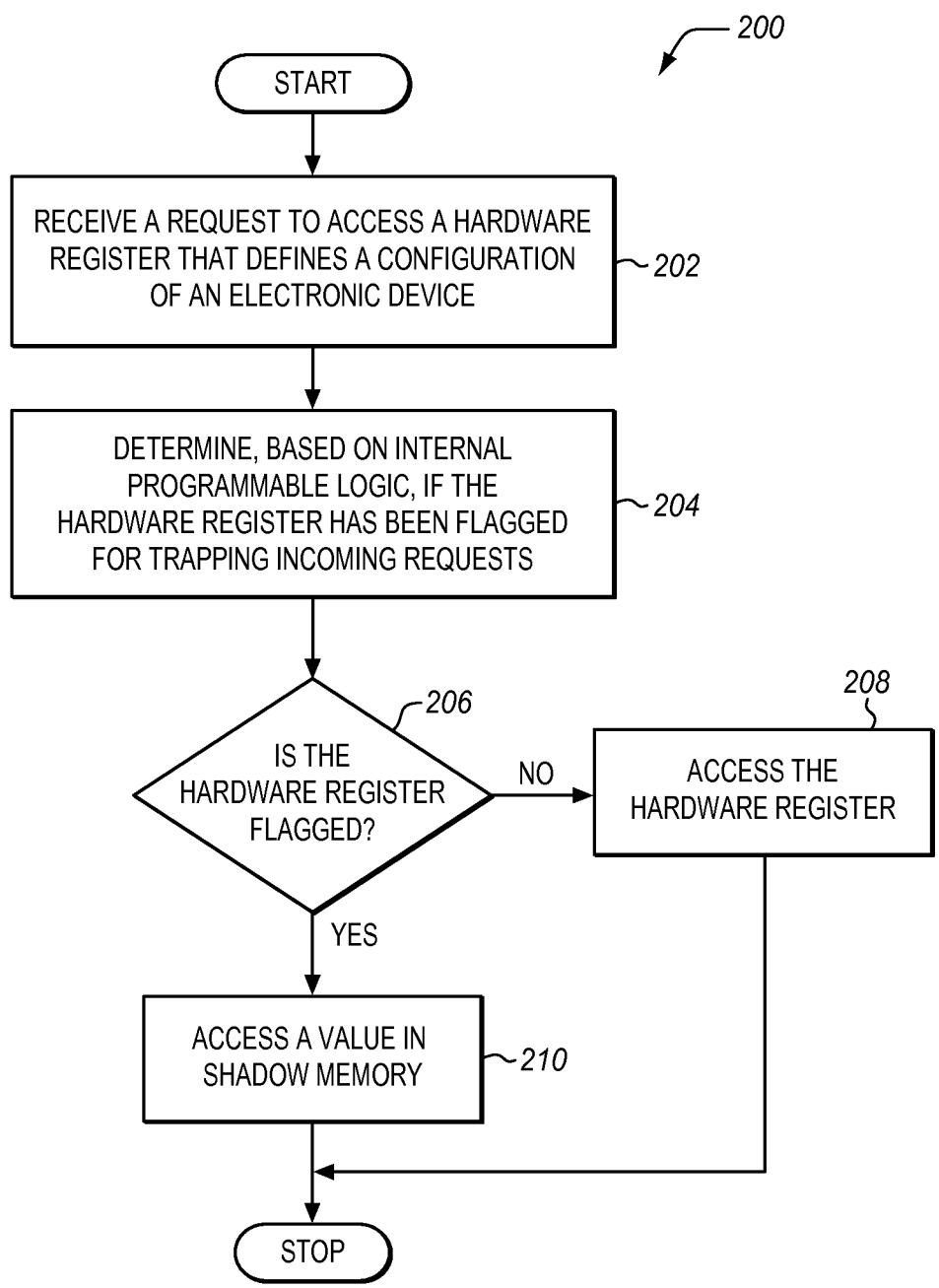
FIG. 2 is a flowchart describing an exemplary method in accordance with features and aspects hereof to trap incoming requests directed to hardware registers.

FIG. 2 is a flowchart describing an exemplary method 200 in accordance with features and aspects hereof to operate an electronic device to trap incoming requests directed to hardware registers.

The method of FIG. 2 may be operable in an electronic system such as described above with regard to FIG. 1. The steps of the flowcharts described herein are not all inclusive and may include other steps not shown. The steps described herein may also be performed in an alternative order.

In step 202, an electronic device receives a request from an external device (such as a management client) to access an internal hardware register. The hardware register defines, in part, the configuration of the electronic device. The request may come in various forms, depending on the communication protocol that the request was received in. For example, in a PCIe system, a request may comprise configuration read packets and configuration write packets from a root complex. Each request may identify one (or potentially more) hardware registers for reading and/or writing. Where multiple hardware registers are indicated, the steps of method 200 may be performed for each of the registers. For example, PCIe configuration read and write requests address 32 bits at a time, and these bits may be stored in one or more hardware registers.

In step 204, circuitry at the electronic device consults internal programmable logic to determine if the hardware register has been flagged for trapping incoming requests. This may include consulting a mapping table that correlates hardware registers with trapping logic. For example, a mapping table could indicate that all incoming requests to a hardware register should be trapped and sent to shadow memory, could indicate that only read requests should be trapped, or could indicate that only write requests should be trapped. The mapping table could further indicate whether incoming read and/or write requests should invoke firmware in order to trigger advanced processing of the incoming request.

In step 206, if the requested hardware register is not flagged for trapping the request then processing continues to step 208, where the register is accessed by the circuitry of the device. Alternatively, if the requested hardware register is flagged for trapping the request then processing continues to step 210. In step 210, a value in shadow memory that corresponds to the hardware register is accessed by the circuitry of the device (instead of the hardware register itself).

Figure 3:
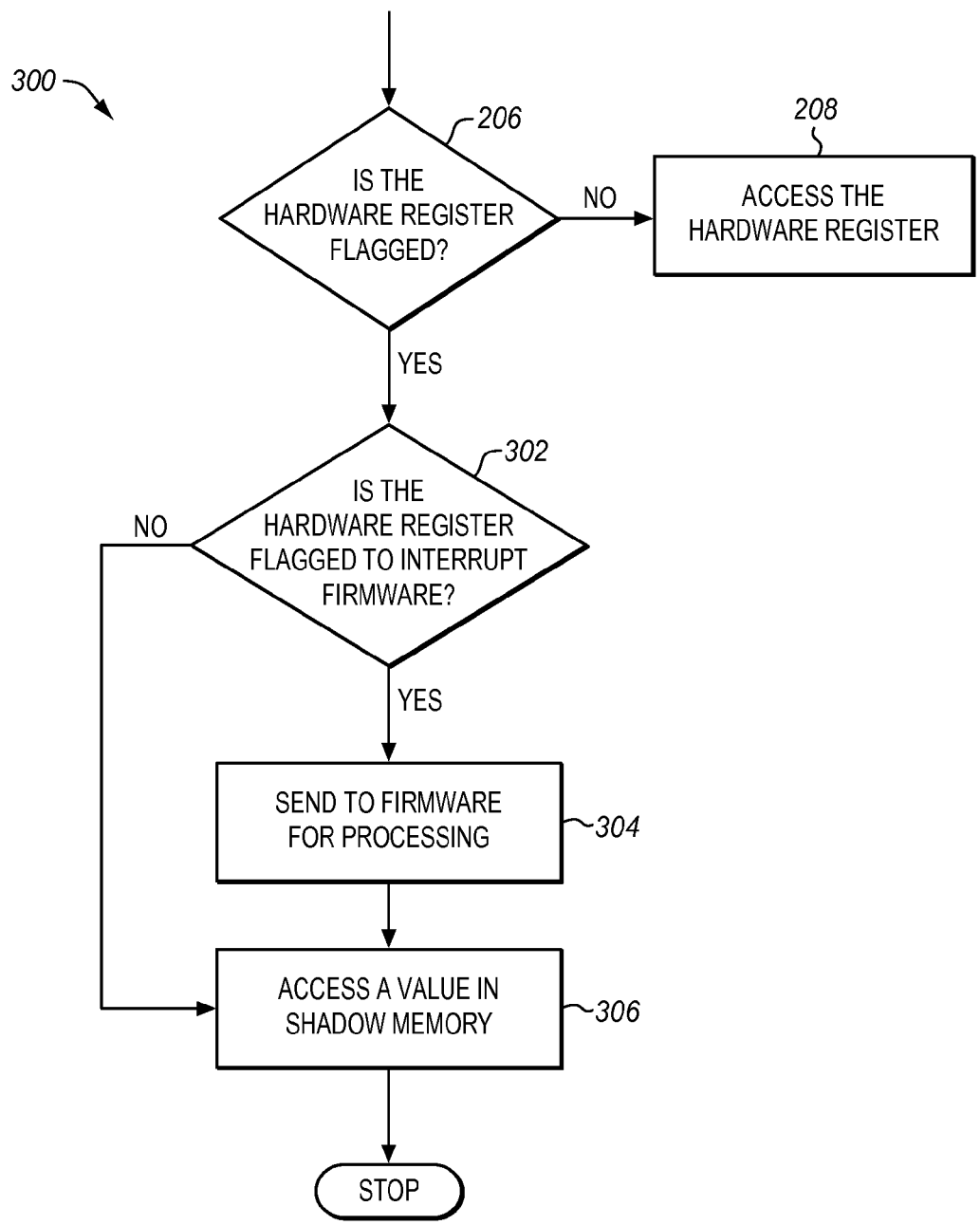
FIG. 3 is a flowchart describing further exemplary features of the method of FIG. 2 in accordance with features and aspects hereof.

FIG. 3 is a flowchart describing further exemplary features of the method of FIG. 2 in accordance with features and aspects hereof Specifically, FIG. 3 describes an embodiment where interrupts are generated to trigger/invoke firmware used for advanced processing. According to FIG. 3, after determining that a hardware register has been flagged for trapping incoming requests (i.e., at step 206 of FIG. 2), processing continues to step 302.

In step 302, a determination is made as to whether the hardware register has been flagged to generate an interrupt for the request. The circuitry of the electronic device may perform this operation by consulting programmable logic. If the hardware register has not been flagged, then the incoming request is processed by hardware circuitry of the device in step 306 in order acquire the value in shadow memory that corresponds to the hardware register.

However, if the hardware register has been flagged for an interrupt, the hardware circuitry invokes firmware at the device by generating an interrupt at a processor of the device in step 304. The interrupt causes firmware to process the incoming request according to advanced processing logic, which may cause the firmware to perform any number of additional and/or alternative functions relating to the hardware register and/or the corresponding value in shadow memory.

Once the firmware has completed its advanced processing, hardware circuitry at the device is operable to access the value in shadow memory in step 306 (e.g., to read the value for later transmission to the management client, or to alter the value in accordance with directives from the management client).

Note that invoking firmware to process a request (e.g., via an interrupt as described above) may substantially increase the time taken in processing a request. In certain operating environments such as PCI or PCI express, if the electronic device takes too long in processing a request, a timeout may occur at the external device that initially sent the request, resulting in error processing. In order to avoid this result, the circuitry of the electronic device may utilize a timer and a threshold value. If the firmware approaches the threshold, or takes longer than the threshold, then the hardware circuitry may elect to report a completion (even though the request has not yet been completed), may report the current value in shadow memory that corresponds to the hardware register, or may report the actual value of the hardware register, in order to prevent the occurrence of a timeout.

FIG. 4 is a block diagram 400 illustrating an exemplary portion of programmable logic in accordance with features and aspects hereof. According to FIG. 4, each register is associated with two bits. The first bit indicates whether incoming read requests directed to the register should be trapped. If the value is set to yes/true, then a value in shadow memory is provided instead of the hardware register. The second bit for each register indicates whether to trap incoming write requests. If the value is set to yes/true, then incoming write requests alter values in shadow memory instead of hardware registers.

FIG. 5 is a block diagram 500 illustrating an additional exemplary portion of masking logic in accordance with features and aspects hereof. According to FIG. 5, the two trapping bits described above with regard to FIG. 4 are used. Additionally, two more bits are used to indicate whether to invoke firmware (e.g., by generating an interrupt) for each of trapped write requests and trapped read requests. Thus, firmware can be invoked for trapped read requests to enable enhanced processing, and/or may be invoked for trapped write requests as well.

While the registers of FIGS. 4-5 are represented with simple integer values, the registers of an electronic device may typically be referred to with an address (e.g., a 32, 64, or 128 bit address).

Figure 6:
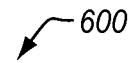
FIG. 6 is a block diagram illustrating multiple hardware registers flagged for trapping, as well as corresponding shadow values in accordance with features and aspects hereof.

FIG. 6 is a block diagram 600 illustrating multiple hardware registers flagged for trapping, as well as corresponding shadow values in accordance with features and aspects hereof Note that some of the information presented in FIG. 6 is located at the hardware registers themselves, while other information is stored in shadow memory. FIG. 6 shows that even when shadow values are used for a hardware register, certain shadow values may still match the values of their flagged hardware register counterparts.

EXAMPLES

Figure 7:
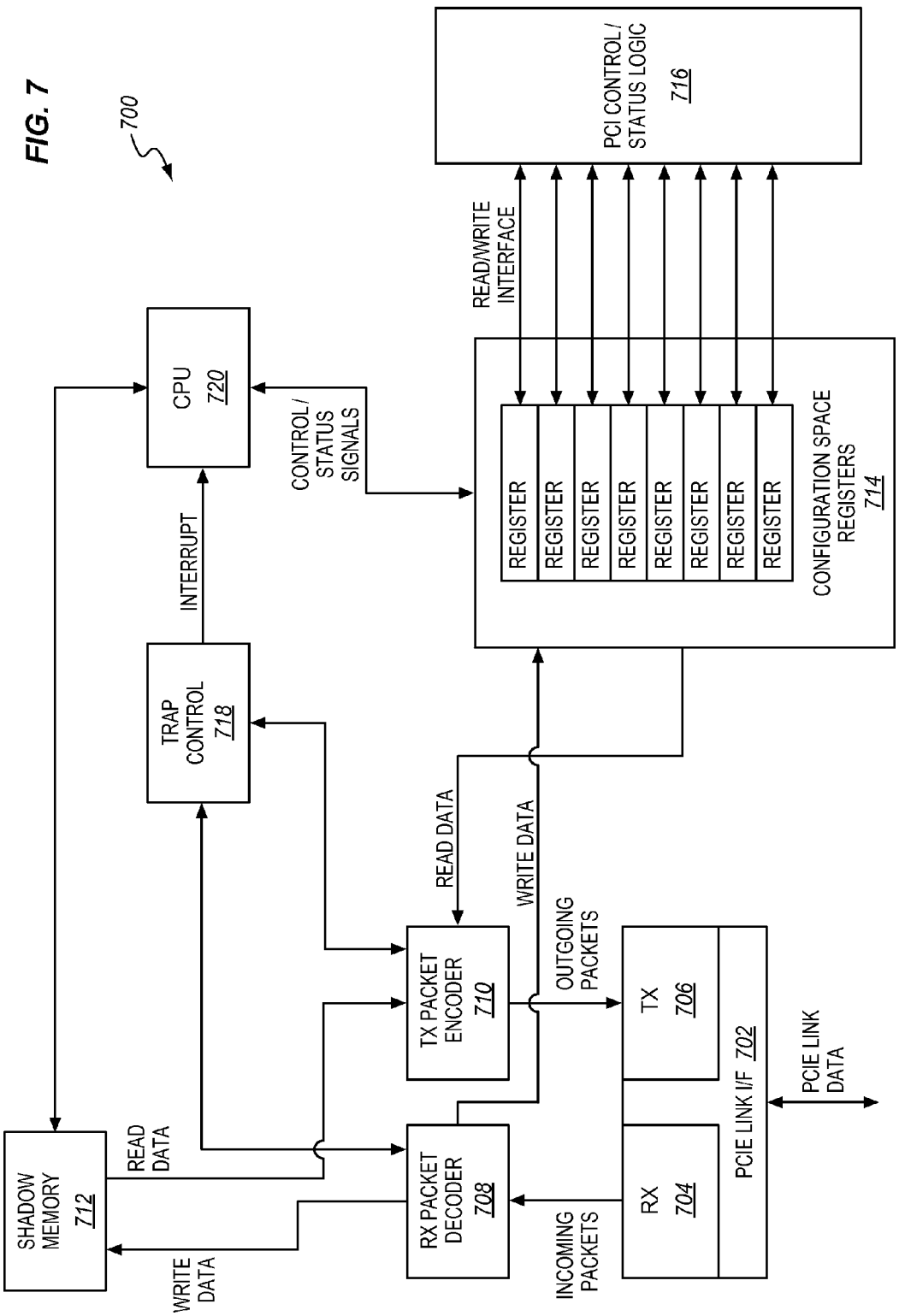
FIG. 7 is a block diagram of an exemplary enhanced electronic PCIe device in accordance with features and aspects hereof.

FIG. 7 is a block diagram of an exemplary enhanced electronic PCIe device 700 in accordance with features and aspects hereof According to FIG. 7, PCI control/status logic 716 performs the designated functions of PCIe device 700 by consulting configuration space registers 714. PCIe device 700 also includes PCIe link interface 702, which receives configuration read and write packets for forwarding via Receiver (RX) 704. Incoming packets are forwarded to RX packet decoder 708. RX packet decoder 708 determines which PCIe configuration space register should be accessed for an incoming request, and consults internal logic to determine whether the address for the register is trapped for the type of access requested (e.g., read and/or write access). If the type of access requested is trapped, it is routed to shadow memory 712. Otherwise, the address is routed to configuration space registers 714.

Additionally, if the requested type of access is trapped for a given register, RX packet decoder 708 contacts trap control circuitry 718. Trap control circuitry 718 includes registers that are used by CPU 720 to indicate which configuration space addresses should trigger interrupts for reads and/or writes.

Transmit (TX) packet encoder 710 builds a response packet for every received configuration request packet, and these response packets are sent out to PCIe link interface 702 via transmitter (TX) 706. If the request was a read request that was not trapped, TX packet encoder 710 uses data directly from configuration space registers 714. Alternatively, if the read request was trapped, data is used from shadow memory 712. For a trapped write access, firmware operating on CPU 720 determines what data, if any, should be written to configuration space registers 714. CPU 720 additionally performs the requested write upon shadow memory 712.

While the invention has been illustrated and described in the drawings and foregoing description, such illustration and description is to be considered as exemplary and not restrictive in character. One embodiment of the invention and minor variants thereof have been shown and described. In particular, certain features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. An electronic device comprising:
   a set of hardware registers that define a configuration of the electronic device;
   circuitry that implements programmable logic defining which hardware registers have been flagged for trapping incoming requests; and
   a shadow memory that includes values corresponding to the flagged hardware registers,
   the circuitry further operable to access a value in the shadow memory that corresponds to a flagged hardware register, responsive to receiving a request from an external device to access the flagged hardware register.

2. The device of claim 1 wherein
   the circuitry is further operable to trap incoming read requests directed to the flagged hardware register, and to return the value in the shadow memory instead of the flagged hardware register.

3. The device of claim 1 wherein
   the circuitry is further operable to trap incoming write requests directed to the flagged hardware register and to alter the value in the shadow memory.

4. The device of claim 1 wherein
   the device further comprises:
      a processor; and
      firmware operable on the processor; and
   the circuitry is further operable to determine, based on the programmable logic, whether to invoke the firmware to process the received request.

5. The device of claim 4 wherein
   the circuitry is further operable to invoke the firmware by generating an interrupt at the processor.

6. The device of claim 4 wherein
   the circuitry is further operable to determine a time taken by the firmware in generating the value in the shadow memory, and is further operable to return a completion to the external device responsive to determining that the time taken by the firmware exceeds a threshold.

7. The device of claim 1 wherein
   the device is a Peripheral Component Interconnect express (PCIe) device, the hardware registers define a PCIe configuration space of the device, and the requests are received via a PCIe interface of the device.

8. The device of claim 1 wherein
   the value in the shadow memory does not equal the value of the corresponding flagged hardware register.

9. The device of claim 1 wherein
   the programmable logic includes two bits for each hardware register:
      a first bit indicating whether to trap incoming read requests; and
      a second bit indicating whether to trap incoming write requests.

10. The device of claim 9 wherein
    the programmable logic includes two additional bits for each hardware register:
       a first additional bit indicating whether to generate an interrupt for incoming read requests; and
       a second additional bit indicating whether to generate an interrupt for incoming write requests.

11. A method of operating an electronic device, the method comprising:
    receiving a request from an external device to access a hardware register that defines a configuration of the electronic device;
    determining via circuitry at the electronic device, based on internal programmable logic, if the hardware register has been flagged for trapping incoming requests;
    accessing, via the circuitry, the hardware register responsive to determining that the hardware register is not flagged; and
    accessing, via the circuitry, a value in a shadow memory of the electronic circuit responsive to determining that the hardware register is flagged.

12. The method of claim 11 wherein
    the request is a read request and accessing the value in the shadow memory comprises:
       trapping the incoming read request directed to the flagged hardware register; and
       returning the value in shadow memory instead of the value in the flagged hardware register.

13. The method of claim 11 wherein
    the request is a write request and accessing the value in the shadow memory comprises:
       trapping the incoming write request directed to the flagged hardware register; and
       altering the value in the shadow memory.

14. The method of claim 11 further comprising
    determining, based on the programmable logic, whether to invoke firmware at a processor of the electronic device to process the received request.

15. The method of claim 14 further comprising
    invoking the firmware by generating an interrupt at the processor.

16. The method of claim 14 further comprising
    determining a time taken by the firmware in generating the value in the shadow memory; and returning a completion to the external device responsive to determining that the time taken by the firmware exceeds a threshold.

17. The method of claim 11 wherein
the device is a Peripheral Component Interconnect express (PCIe) device, the hardware registers define a PCIe configuration space of the device, and the requests are received via a PCIe interface of the device.

18. A non-transitory computer readable medium embodying programmed instructions which, when executed by a processor, are operable for performing a method comprising:
receiving a request from an external device to access a hardware register that defines a configuration of the electronic device;
determining via circuitry at the electronic device, based on internal programmable logic, if the hardware register has been flagged for trapping incoming requests;
accessing, via the circuitry, the hardware register responsive to determining that the hardware register is not flagged; and
accessing, via the circuitry, a value in a shadow memory of the electronic circuit responsive to determining that the hardware register is flagged.

19. The medium of claim 18 wherein
the request is a read request and accessing the value in the shadow memory comprises:
trapping the incoming read request directed to the flagged hardware register; and
returning the value in shadow memory instead of the value in the flagged hardware register.

20. The medium of claim 18 wherein
the request is a write request and accessing the value in the shadow memory comprises:
trapping the incoming write request directed to the flagged hardware register; and
altering the value in the shadow memory.

\* \* \* \* \*